Dec. 5, 1961 J. FRANZONE ET AL 3,012,164
PLASTIC ELECTROLUMINESCENT LIGHTING ARTICLES
AND METHOD OF FABRICATION THEREOF
Filed Dec. 11, 1959 2 Sheets-Sheet 1
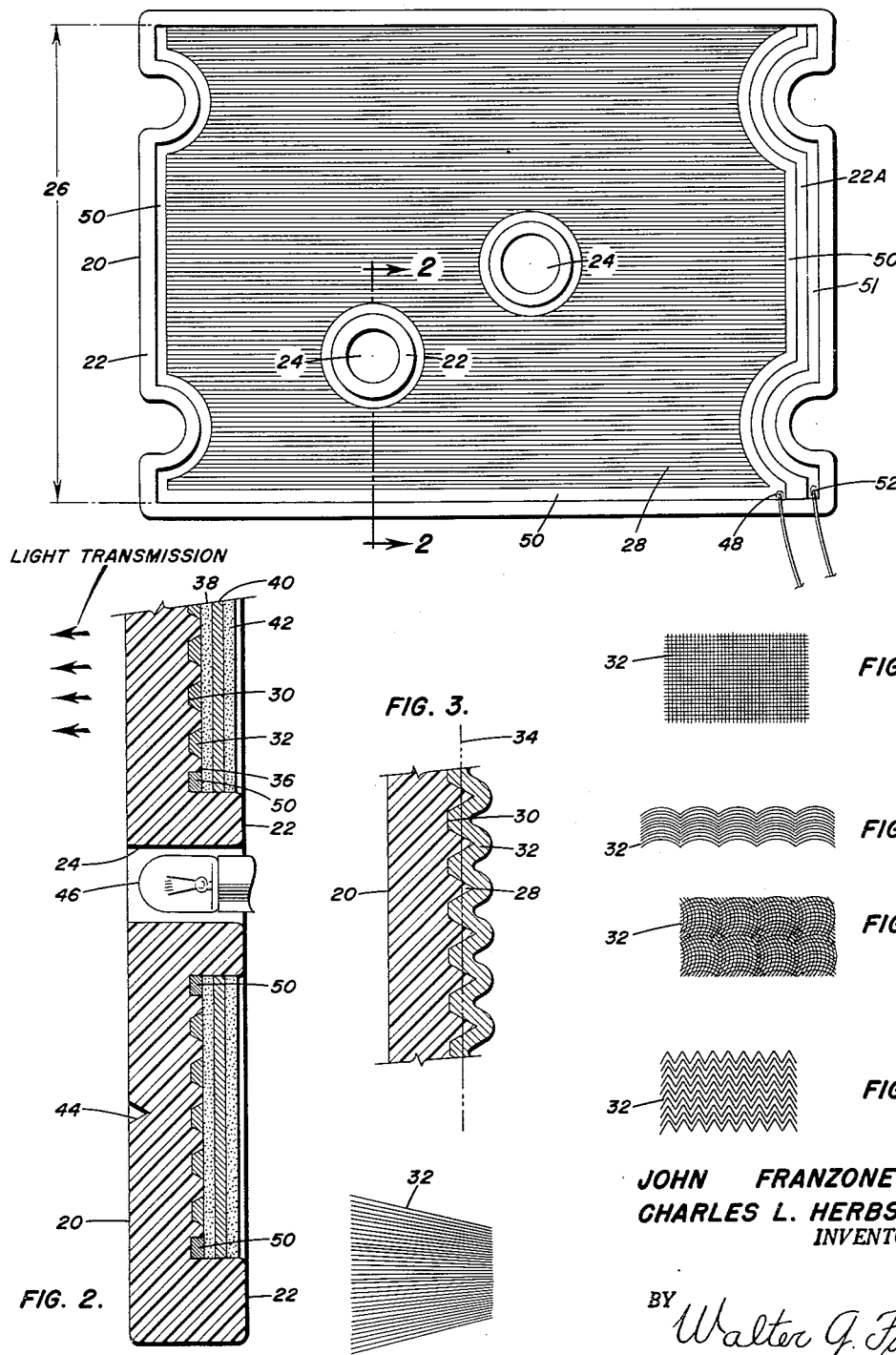
JOHN FRANZONE
CHARLES L. HERBST
INVENTORS
BY Walter G. Finch
ATTORNEY Dec. 5, 1961   J. FRANZONE ET AL   3,012,164
PLASTIC ELECTROLUMINESCENT LIGHTING ARTICLES
AND METHOD OF FABRICATION THEREOF
Filed Dec. 11, 1959   2 Sheets-Sheet 2
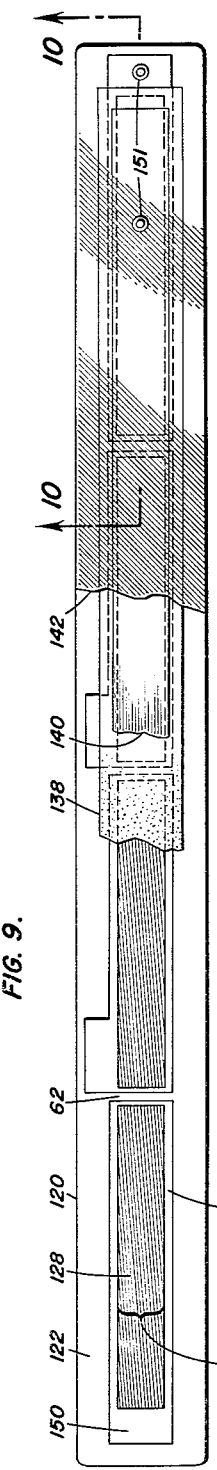
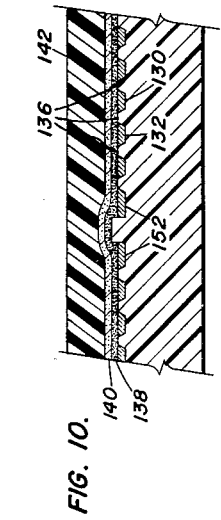
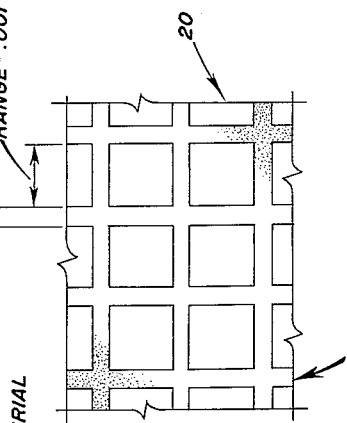
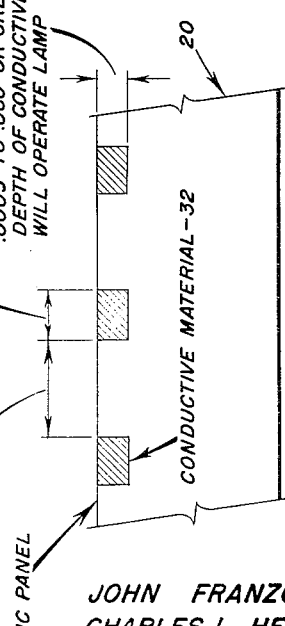
JOHN FRANZONE
CHARLES L. HERBST
INVENTORS
BY Walter G. Finch
ATTORNEY

United States Patent Office 3,012,164
Patented Dec. 5, 1961

3,012,164
PLASTIC ELECTROLUMINESCENT LIGHTING ARTICLES AND METHOD OF FABRICATION THEREOF
John Franzone and Charles L. Herbst, Baltimore, Md., assignors to Fawn Plastics Company, Inc., Timonium, Md., a corporation of Maryland
Filed Dec. 11, 1959, Ser. No. 858,934
17 Claims. (Cl. 313—108)

This invention relates generally to electric lamp type articles, and more particularly, it pertains to methods for fabricating improved electroluminescent screens and display atricles produced thereby as well as to the plastic electroluminescent articles produced by the methods.

Electroluminescence of an article is generated by electrically exciting a suitable phosphor sandwiched as a dielectric between two adjacent electrical conductors. The light produced in the article in order to be useful must be made visible by constructing at least one of the electrical conductors as a transparent film or by fabricating it as a series of lines with optically clear spaces between.

It has been proposed to silk screen or photoetch the grid patterns. However, the resulting conductive line structure in the article is then of a raised type and causes a troublesome electric breakdown condition because of the resulting reduction of the front or primary to back or secondary electrode spacing.

Accordingly, it is the object of this present invention to provide a transparent or translucent plastic material with an embedded electrically conductive line structure electrode for an electroluminescent lamp.

Another object of this invention is to provide a method for cheaply and easily constructing electro-conductive spaced line patterns flush with the surface of optically conductive material.

Still another object of this invention is to provide an electrode line structure in an article having improved cross section for optimum light and electrical conductivity in electroluminescent lamps.

And yet another object of this invention is to provide electroluminescent displays having selected areas of different light intensity.

Another object of this invention is to provide character illumination of articles by combination of incandescent and excited phosphor lighting thereof.

Still another object of this invention is to provide new types of plastic electroluminescent lighting articles which are economical to manufacture, efficient and reliable in operational use, and which are compact and readily assembled and disassembled in electrical circuits.

These and other objects and attendant advantages of the invention will become more readily apparent and understood from the following detailed specification and accompanying drawings in which:

FIG. 1 is a back plan view of an electroluminescent panel incorporating features of this invention, before the phosphor, secondary and final sealing coats are applied thereto;

FIG. 2 is a cross section along the line 2—2 of FIG. 1 with the addition of the missing coats;

FIG. 3 is a cross section of the panel and primary film illustrating a step in the preparation thereof;

FIG. 4 is an enlarged section of an electrode grid pattern for uniform illumination;

FIGS. 5, 6, and 7 are enlarged sections of electrode grid patterns of different designs providing novel decorative effect from electroluminescent panels;

FIG. 8 is an enlarged section of a pattern for an electrode grid which produces a uniformly graduated light output over the area thereof;

FIG. 9 is an enlarged plan view, with parts removed, of a strip lamp type panel;

FIG. 10 is an enlarged cross section taken along line 10—10 of FIG. 9;

FIG. 11 is a cross section taken through a typical panel to illustrate the dimensions thereof; and FIG. 12 is an enlarged plan view of a grid work of a typical panel illustrating the dimensions of the grid pattern thereof.

Referring now to FIG. 1 of the drawings, there is shown an electroluminescent panel, shown generally by reference numeral 20. This panel 20 is preferably made of a thermoplastic material, such as acrylic sheet, which has light piping characteristics are properties.

A raised border or wall 22 is provided around the periphery of the panel 20 as well as around any aperture 24 which may be provided in the panel as desired, as illustrated best in FIGS. 1 and 2.

A recess 26, in the panel 20 as defined by the border or wall 22, is formed, with a series of molded raised portions or ridges 28 having valleys 30 therebetween, as shown in FIGS. 1 and 2. It is important that area or strip 50 be a continuous silver buss so that continuity is not interrupted from one end of the panel to the other.

An electrically conductive paint or paste of silver is spread thinly within the recess 26, coating the ridges 28 and filling the valleys 30, as shown in detail in FIG. 3. The entire recess 26 is then polished to remove the excess silver to a depth 34, as shown in FIG. 3, and thus removing that portion of the film 32 to the right of line 34.

The polishing process of the recess 26 is continued to truncate the ridges 28 to a greater or lesser extent. This leaves a series of end connected metal lines or filled valleys 30 and a polished plastic surface 36, as shown in FIG. 2, providing a light transmission, when viewed from the left or front, of from thirty (30) percent to approximately ninety (90) percent depending upon the number of valleys 30 provided in the recess 26 of the panel and the degree of polish thereof.

Or, in the alternate, the silver can be sprayed or brushed or spread in any manner on the surface to fill the valleys 30, and the excess thereof can be wiped off by a cloth. In this method, the polishing step would be eliminated.

An electrical connection 48 to an external lead is next affixed onto the film 32, as shown in FIG. 1.

An electroluminescent phosphor coat 38 is then applied to the recess 26 by spraying it over the entire conductive primary film 32. An electrically conductive secondary coating 40 is next applied to phosphor coat 38. This can be done either by spraying, or vacuum metalizing the secondary coating over the phosphor coat 38, and extending it over a non-conductive area or space 22A on the panel 20 and on the same plane as a silver buss 51, as shown in FIG. 1. A connection 52 is attached to the buss 51 and this connection is connected to an external load. A final insulating or sealing compound coat 42, built up to the height of the peripheral walls 22, completes the assembly. This coat 42 can consist of a protective coating epoxy and/or polyester resin for humidity sealing of the lamp.

When alternating current is applied to the connections 48 and 52 through the external leads, the phosphor coat 38 is excited to produce light which is transmitted in the direction of the arrows shown in FIG. 2.

In accordance with well-known edge lighting principles, an engraved character 44 can be thus made to glow with the light of characteristic color given off by the phosphor coat 38. The character 44 can be further illuminated and made to change from colored to white by switching on an edge lighting lamp 46 provided within one of the apertures 24. For this service, it may be desirable to paint the area surrounding the character 44 with an opaque paint.

Various pleasing variegated or moire effects can be created in the phosphor light emitted by the panel 20 with variations in the pattern of the primary film 32, as shown by the series of patterns of FIGS. 4, 5, 6, 7, and 8.

First, there is an obscuring effect or shadow of the pattern which is visible, and second, there is a gradient in the emitted light due to non-uniform line spacing and consequent non-uniform electrical excitation of the phosphor.

The pattern of the primary film 32, if desired, can consist of a plurality of straight lines, as shown in FIGS. 1 to 3. It has been found that when straight lines are used, the pattern should have the ranges indicated in FIGS. 11 and 12. It has also been determined that the spacing between the pattern lines may vary in proportion to the number of lines, and that the width of the impressed lines may vary from .0005" wide to .040" wide.

The pattern of the lines of the primary film 32 may take the shape of the grid network shown in FIG. 4. This grid network of lines may be as indicated in FIG. 12. The spacing between the lines may vary in proportion to the number of lines in the grid network. In the pattern of FIG. 4, the width of the impressed lines may vary from .0005" wide to .040" wide.

If desired, the impressed lines for the primary film 32 may also be arranged wavy or curved as shown in FIG. 5. In this instance, it has been found that the range shown in FIG. 11 is the most desirable, with the width of the impressed lines varying from .0005" to .040" wide. In some cases, it may be desirable to make lines arcuate and substantially parallel, that is, of a series of concentric circles 128 with large radii, as shown in FIG. 9.

The impressions of the lines for the primary film 32 may also run as a wavy or sawtooth or irregular shape grid network as illustrated in FIGS. 6 and 7. In these examples, it has been found advisable to have a grid network of lines as shown in FIG. 12, with the width of the impressed line varying from .0005" wide to .040" wide and at a depth .001" to .060".

In the arrangement of the lines of FIG. 8, for the conductive coating 32, the lines are formed so that they diverge. Such an electrode grid arrangement will produce a uniformly graduated light output over the area of the panel.

In FIGS. 11 and 12, the range between adjacent lines is illustrated as being from .001" to .040", with an optimum condition at approximately .005", while the width of the lines is indicated to be in the range of .0005" to .040", with an optimum of .0015". In addition, the depth of the conductive film 32 should preferably be from .0005" to .060" or greater to operate a lamp.

Referring now to FIGS. 9 and 10 of the drawings, there is shown a long narrow strip lamp 60 which consists of an electroluminescent plastic type panel 120 having a border or wall 122. A recess 126 is provided lengthwise of the panel 120 within the border or wall 122 in the upper face thereof. A series of spaced dividing walls 62 are provided along the recess 120.

As in the embodiment of the panel 20 of FIGS. 1 to 3 previously described, panel 120 is provided with a series of molded ridges 128 located between valleys 130. These ridges 128 and valleys 130 are preferably of large or arcuate shape, that is, of arc sections of circles with large radii so as to be substantially parallel. The valleys 130 and ridges 128 are covered with conductive primary film 132 corresponding to primary film 32 as previously described in connection with the panel 20 of FIGS. 1 to 3, and the surface 136 is polished or wiped as previously mentioned for surface 36 of panel 20. As illustrated in FIGS. 9 and 10, a buss bar 152 is then sprayed, ruled, silk screened or photo-etched around the entire periphery of the line pattern within the recess 126. These buss bars are an integral part of the primary conductive film 132 and the tie points 150.

An electro-luminescent phosphor coat 138 is then applied to surface 136 as described for electro-luminescent phosphor coat 38 of panel 20. Then, an electrically conductive secondary coating 140 is applied over the electroluminescent phosphor coat. Electrical connections are made by attaching pins or straps 151 to the tie points 150 and the electrically conductive secondary coating 140 by means of conductive cement 153. A protective coating 142, such as polyester and/or epoxy resin is then applied to the entire surface as a seal against humidity and lamp damage protection.

In operational use, each pin is connected to an external lead. These leads, in turn, are connected through a suitable source of power to electrical components whose conditions are to be indicated on the panel 120.

Obviously, many modifications and variations of the present invention are possible in the light of the above teachings. It is, therefore, to be understood that within the scope of the appended claims the invention may be practiced otherwise than as specifically described.

What is claimed is:

1. An electroluminescent lighting article, comprising, a transparent dielectric base with light-piping properties having a surface formed thereon, a plurality of spaced ridges and valleys between said ridges formed in said surface of said transparent dielectric base, said valleys being filled with an electrically conductive film, continuous buss means for connecting the ends of the electrically conductive films in said valleys together to form a first electrode, the upper surfaces of said ridges and valleys terminating in a common upper plane, a coating of luminescent phosphor placed on said common plane defining said upper surfaces of said ridges and valleys filled with said electrically conductive film defining said first electrode, a second electrically conductive film placed on said coating of luminescent phosphor and defining a second electrode, and means for completing an electrical circuit through said electrodes.

2. An electroluminescent lighting article, comprising a transparent dielectric base with light-piping properties having a recessed surface formed thereon, spaced ridges in said surface and valleys between said ridges formed in said surface of said transparent dielectric base, a grid of electrical conductors positioned in said valleys, continuous buss means for connecting the ends of said conductors together to form a first electrode, the upper surfaces of said ridges and electrical conductors in said valleys terminating in a common upperplane, a coating of luminescent phosphor placed along said common plane defining said upper surfaces of said ridges and electrical conductors in said valleys defining said first electrode, a conductive film placed on said luminescent phosphor coating and defining a second electrode, and means for completing an electrical circuit through said electrodes.

3. An electroluminescent lighting article as recited in claim 2, wherein said recessed surface in said transparent dielectric base is encompassed by a narrow border.

4. An electroluminescent lighting article as recited in claim 2, wherein said transparent dielectric base is formed of transparent plastic sheet material.

5. An electroluminescent lighting article as recited in claim 2, wherein said transparent dielectric base is formed of translucent sheet material.

6. An electroluminescent lighting article as recited in claim 2, wherein said transparent dielectric base has at least one aperture provided therein, and means in said aperture for lighting the edges of said plastic base.

7. An electroluminescent lighting article as recited in claim 2, wherein said ridges and said conductors within said valleys are spaced parallel with respect to each other.

8. An electroluminescent lighting article as recited in claim 2, wherein said ridges and said conductors within said valleys are arranged in a sawtooth pattern.

9. An electroluminescent lighting article as recited in claim 2, wherein said ridges and said conductors within said valleys are arranged in a wavy pattern.

10. An electroluminescent lighting article as recited in claim 2, wherein said ridges and said conductors within said valleys are arranged in a mesh pattern.

11. An electroluminescent lighting article as recited in claim 2, wherein said ridges and said conductors in said valleys are of large arcuate pattern.

12. An electroluminescent lighting article as recited in claim 2, wherein said width of said conductors in said valleys varies from .0005" to .040", and the ridges therebetween vary from .001" to .040".

13. An electroluminescent lighting article as recited in claim 2, wherein said optimum width of each conductor is .0015".

14. An electroluminescent lighting article as recited in claim 13, wherein the depth of each conductor varies between .0005" to .060".

15. An electroluminescent lighting article as recited in claim 2, wherein a low density of ridges with conductors in said valleys are provided to reduce the light given off by said lighting article.

16. An electroluminescent lighting article as recited in claim 2, wherein a high density of ridges with conductors in said valleys are provided to reduce light output of said article by obscuring effect.

17. An electroluminescent lighting article as recited in claim 2, wherein said conductive film defining said second electrode is coated with a protective coating.

References Cited in the file of this patent

UNITED STATES PATENTS

| | | |
|---|---|---|
| 2,768,310 | Kazan et al. | Oct. 23, 1956 |
| 2,773,216 | Edmonds | Dec. 4, 1956 |
| 2,773,992 | Ullery | Dec. 11, 1956 |
| 2,838,715 | Payne | June 10, 1958 |
| 2,847,602 | Michlin | Aug. 12, 1958 |
| 2,884,541 | Nicoll | Apr. 28, 1959 |

FOREIGN PATENTS

| | | |
|---|---|---|
| 787,401 | Great Britain | Dec. 11, 1957 |
| 798,505 | Great Britain | July 23, 1958 |
| 815,089 | Great Britain | June 17, 1959 |